United States Patent [19]

Aonuma et al.

[11] Patent Number: 4,686,149

[45] Date of Patent: Aug. 11, 1987

[54] MAGNETIC RECORDING MEDIUM AND METHOD OF PREPARING

[75] Inventors: Masashi Aonuma; Hideomi Watanabe; Takahito Miyoshi; Tsutomu Okita, all of Kanagawa, Japan

[73] Assignee: Fuji Photo Film Co., Ltd., Kanagawa, Japan

[21] Appl. No.: 831,784

[22] Filed: Feb. 21, 1986

[30] Foreign Application Priority Data

Feb. 21, 1985 [JP] Japan .................................. 60-31602

[51] Int. Cl.[4] ............................................ B32B 27/08
[52] U.S. Cl. .................................... 428/522; 427/39; 427/40; 427/41; 427/44; 427/129; 427/131; 428/500; 428/694; 428/900
[58] Field of Search ................... 427/131, 129, 40, 41, 427/44, 39; 428/694, 900, 500, 522

[56] References Cited

U.S. PATENT DOCUMENTS

| | | | |
|---|---|---|---|
| 4,267,202 | 5/1981 | Nakayama et al. | 427/40 |
| 4,421,780 | 12/1983 | Buzio et al. | 427/40 |
| 4,468,436 | 8/1984 | Okita et al. | 427/131 X |
| 4,518,681 | 5/1985 | Johnson et al. | 427/40 X |

*Primary Examiner*—Bernard D. Pianalto
*Attorney, Agent, or Firm*—Sughrue, Mion, Zinn Macpeak & Seas

[57] ABSTRACT

A method is described for preparing a magnetic recording medium comprising a non-magnetic support having provided thereon a magnetic layer containing a compound which is cross-linkable or polymerizable by radiation exposure, which comprises conducting a corona discharge treatment on a surface of a support, coating an aqueous dispersion of hydrophobic polymer on the surface of the support to form an undercoat layer, providing a magnetic layer on the undercoat layer, and exposing the magnetic layer to radiation.

15 Claims, No Drawings

MAGNETIC RECORDING MEDIUM AND METHOD OF PREPARING

FIELD OF THE INVENTION

The present invention relates to a method for preparing a magnetic recording medium such as video tapes, audio tapes, computer tapes, and floppy discs.

BACKGROUND OF THE INVENTION

Magnetic recording media which are generally and widely used these days typically employ as a binder a thermoplastic resin alone or in combination, such as a vinyl chloride-vinyl acetate type resin, a vinyl chloride-vinylidene chloride type resin, a cellulose resin, an acetal resin, and a urethane resin, or an acrylonitrile-butadiene resin. Such magnetic recording media have defects such as that as a wear resistance of a magnetic layer is poor, the tape path of magnetic tapes easily stains.

It is known that as a binder, a thermosetting resin such as a melamine resin or urea resin is used and that a binder of the above-described thermoplastic resin to which a binder cross-linkable by a chemical reaction such as an isocyanate compound or an epoxy compound is added is used. However, the use of the cross-linkable binder is accompanied by defects such as that (1) a resin solution having dispersed magnetic particles therein has poor storage stability, that is, pot life is short, physical properties of magnetic coating composition are not homogeneous and a magnetic tape cannot have homogeneous quality and that (2) after a magnetic coating composition is coated and dried, a heat treatment is necessary for hardening the coated layer. Thus, a long period of time is necessary for manufacturing the product.

In order to overcome the above defects, a method for preparing a magnetic recording medium using as a binder an oligomer and a monomer of acrylic acid ester type and hardening the binder by electron beam irradiation after drying is disclosed in U.S. Pat. Nos. 3,871,908 and 4,443,490, Japanese Patent Publication No. 12423/1972, and Japanese Patent Application (OPI) Nos. 15104/1972 and 77433/1975 (the term "(OPI)" used herein means a "published unexamined Japanese patent application").

Recently, a support of a magnetic recording medium has been required to be thin in order to provide long term recording and light weight thereof, and a magnetic recording medium has been required to be used under more harsh condition. A magnetic tape which is prepared by a conventional method using electron beam irradiation for hardening is often folded while the tape is running and the magnetic layer may easily separate from the support in a tape recorder, thereby staining the tape running path. In some cases, the magnetic layer may separate during the steps of smoothing treatment using calendering and slitting. Therefore, a sufficiently excellent magenetic recording medium has not been obtained so far.

SUMMARY OF THE INVENTION

Thus, a first object of the present invention is to provide a magnetic recording medium having good wear resistance.

A second object of the present invention is to provide a magnetic recording medium having magnetic layer that does not separate from the support in a tape recorder.

A third object of the present invention is to provide a magnetic recording medium having a magnetic layer that does not separate during the steps of smoothing and slitting.

A fourth object of the present invention is to provide a magnetic recording medium having good electromagnetic properties.

A fifth object of the present invention is to provide a magnetic recording medium having homogeneous quality and a magnetic coating composition that has good storage stability.

A sixth object of the present invention is to provide a magnetic recording medium which does not require heat treatment for hardening of the coated magentic layer.

The inventors of the present invention have conducted extensive research in the area of binders hardened by electron beam irradiation, and as a result they have reached the present invention.

The present invention relates to a method for preparing a magnetic recording medium comprising a non-magnetic support having provided thereon a magnetic layer containing a compound which is cross-linkable or polymerizable by radiation exposure, which comprises conducting a corona discharge treatment on a surface of the support, coating an aqueous dispersion of hydrophobic polymer on the surface of the support to form an undercoat layer, providing a magnetic layer thereon and exposing the magnetic layer to radiation. The above objects can be accomplished by this method.

DETAILED DESCRIPTION OF THE INVENTION

The present invention is further illustrated in more detail hereinafter.

Materials for a non-magnetic support used in the present invention include polyesters such as polyethylene terephthalate or polyethylene-2,6-naphthalate; polyolefins such as polyethylene or polypropylene; cellulose derivatives such as cellulose triacetate, cellulose diacetate, cellulose acetate butyrate, or cellulose acetate propionate; vinyl type resins such as polyvinyl chloride or polyvinylidene chloride; plastics such as polycarbonate, polymide or polyamideimide; non-magnetic metals such as aluminum, copper, tin, zinc, or non-magnetic alloys of the above metals and stainless steel; and a paper, a baryta, or a paper coated or laminated with polymers of $\alpha$-olefins having from 2 to 10 carbon atoms such as polyethylene, polypropylene, or a copolymer of ethylene and butene. These non-magnetic supports can be rendered transparent or opaque depending upon their intended use.

Among those materials, polyethylene terephthalate, cellulose triacetate, polyimide and polyamideimide are preferred, and polyethylene terephthalate is more preferred. Particularly a polyethylene terephthalate film which is biaxially elongated and heat-fixed is effectively used because of its stability and its toughness.

The shape of the support can be a film, a tape, a sheet, a disc or the like, and the materials for the support can be selected depending upon the shape thereof. The surface roughness (Ra) (defined by JIS B0601; cut-off value 0.25 mm) of the support is preferably 0.2 $\mu$m or less and more preferably 0.05 $\mu$m or less.

The thickness of the non-magnetic support is generally from about 2 to 100 μm and preferably from 3 to 75 μm.

When a support is in a shape of a film, a tape, a sheet, or a thin flexible disc, it is often desirable that a backing layer is provided on the back surface of the support opposite to the magnetic layer for the purpose of preventing static charging, print through and wow flutter, and improving the strength of the magnetic recording medium and running properties of the back surface.

In order to prepare a coating solution for a backing layer, at least one of additives such as a lubricating agent, an abrasive agent, or an antistatic agent, and a dispersing agent, if necessary for dispersing the additive homogeneously, a binder and a solvent used for coating are mixed, kneaded, and dispersed. Then, the resulting coating solution is coated on the back surface of the support to prepare a backing layer and is dried. Any one of a backing layer or a magnetic layer can be provided on a support precedingly.

Commonly and preferably used additives include carbon black, graphite, talc, $Cr_2O_3$, $\alpha$-$Fe_2O_3$ (red iron oxide), and silicone oil. Preferred binders include a thermosetting resin, a reactive type resin, and a compound which is cross-linkable or polymerizable by radiation exposure.

Per solid content of a backing layer, an additive of an inorganic compound is used in an amount of from about 30 to 85 wt% and preferably from 40 to 80 wt%, and an organic additive is used in an amount of about from 0.1 to 30 wt% and preferably from 0.2 to 20 wt%. The dry thickness of the backing layer is from about 0.5 to 50 μm, which can be optionally selected depending upon the total thickness, the shape, and the intended use of the magnetic recording medium.

It is effective that corona discharge treatment is done on the surface of a support as a pre-treatment before an undercoat layer is provided on the surface of the non-magnetic support.

The term "corona discharge treatment" referred to in the present invention means such a treatment that a pair of electrodes are positioned in a gas at a pressure of from about 100 mmHg to about 3 atmospheres, preferably from 300 mmHg to 2 atmospheres, and high voltage is charged between the two electrodes to form a discharge "corona", and the object to be treated is brought into contact with the corona. When an object to be treated is a non-magnetic support, it is desirable that one of the two electrodes is a metallic roller electrode and the support is made running along the metallic rolled electrode to receive a corona discharge treatment. When a thin film is to be treated, it is desirable that a surface of a roller electrode is coated with a dielectric material. The other electrode can have any shape such as an acicular shape, a pole shape, a wire shape, or a knife shape. A direct current, an alternating current having an optional wave shape, or a direct current superimposed with an alternating current having an optional wave shape can be used for voltage used for charging between two electrodes. A sine wave, triangular wave, square wave, saw wave, and pulse wave having an earth to peak value of from 2 to 30 kV (more preferably from 5 to 20 kV) and a frequency of from 50 Hz to 500 kHz (more preferably from 500 Hz to 200 kHz) are preferred in view of the effectiveness of the corona discharge treatment. An amount of electric energy used for charging between the two electrodes depends upon materials and usage of the objects to be treated, but it is generally from 500 to 30,000 joule/$m^2$, preferably from 1,000 to 20,000 joule/$m^2$, of the surface area of objects to be treated. If the charging energy is too low, the effect of the corona discharge treatment cannot be obtained. If the charging energy is too high, the surface of the support deteriorates, and the adhesive property is also reduced. The treatment time is not particularly limited as long as the temperature of the object treated is below its softening point, and it is generally from 0.01 to 2 seconds.

It is preferred that the corona discharge treatment is carried out in an atmosphere of oxygen, nitrogen, hydrogen, carbon monoxide, carbon dioxide, ammonia, hydrocarbon having from 1 to 10 carbon atoms, helium, argon, fluorine compound, and the mixture thereof, with oxygen, nitrogen and argon being more preferably used.

The corona discharge treatment is done at a normal temperature or higher, and particularly when a non-magnetic support is a plastic, the temperature is preferably its glass transition point or higher.

An undercoat layer is provided on the non-magnetic support after the corona discharge treatment is completed. It is preferred that these two steps should be conducted in as short a time as is practically possible, generally within 24 hours, preferably within 1 hour, and more preferably within 1 minute. In view of safety and environmental considerations, an undercoat layer which is provided after corona discharge treatment is an aqueous type. An aqueous type undercoat layer which is prepared by coating an aqueous dispersion of hydrophobic polymer is suitable.

Examples of hydrophobic polymers used for the undercoat layer in the present invention include halogen-containing synthetic resins such as polyvinyl chloride, polyvinyl bromide, polyvinyl fluoride, polyvinylidene chloride, chlorinated polyethylene, chlorinated polypropylene, brominated polyethylene, chlorinated rubber, a copolymer of vinyl chloride and ethylene, a copolymer of vinyl chloride and propylene, a copolymer of vinyl chloride and styrene, a copolymer of vinyl chloride and isobutylene, a copolymer of vinyl chloride and vinylidene chloride, a copolymer of vinyl chloride, styrene, and maleic anhydride, a copolymer of vinyl chloride, styrene, and acrylonitrile, a copolymer of vinyl chloride and butadiene, a copolymer of vinyl chloride and isoprene, a copolymer of vinyl chloride and chlorinated propylene, a copolymer of vinyl chloride, vinylidene chloride, and vinyl acetate, a copolymer of vinyl chloride and acrylate, a copolymer of vinyl chloride and maleic acid ester, a copolymer of vinyl chloride and methacrylate, a copolymer of vinyl chloride and acrylonitrile, an inner plasticized polyvinyl chloride, a copolymer of vinyl chloride and vinyl acetate, polyvinylidene chloride, a copolymer of vinylidene chloride and methacrylate, a copolymer of vinylidene chloride and acrylonitrile, a copolymer of vinylidene chloride and acrylate, a copolymer of chloroethyl vinyl ether and acrylate, or a polyvinylidene fluoride; polyolefines such as polyethylene, polypropylene, polybutene or poly-3-methylbutene; α-olefin copolymers such as a copolymer of ethylene and propylene, a copolymer of ethylene, propylene, and 1,4-hexadiene, a copolymer of ethylene and vinyl acetate, a copolybutene-1-propylene or a copolymer of butadiene and acrylonitrile; a mixture of the above-described copolymers with halogen-containing resins; acrylic resins such as a copolymer of acrylate and acrylonitrile, a copolymer of acrylate and styrene, a copolymer of methacrylate and acrylonitrile, a copolymer of methacrylate and styrene, polyalkyl acrylate, a copolymer of acrylic acid and butyl acrylate, a copolymer of acrylate, butadiene, and styrene, a copolymer of methacrylate, butadiene, and styrene, a copolymer of methyl methacrylate, ethyl acrylate, 2-hydroxyethyl acrylate, and methacrylic acid (weight ratio: 67/23/7/3), a copolymer of methyl methacrylate, ethyl acrylate, 2-hydroxyethyl acrylate, and methacrylic acid (weight ratio: 73/17/7/3), a copolymer of methyl methacrylate, ethyl acrylate, 2-hydroxyethyl acrylate, and methacrylic acid (weight ratio: 70/20/7/3), or a copolymer of methyl methacrylate, butyl acrylate, 2-hydroxyethyl acrylate, and methacrylic acid (weight ratio: 70/20/7/3); polystyrene and a copolymer of styrene and other monomer(s) (e.g., maleic anhydride, butadiene, acrylonitrile, etc.) such as a copolymer of acrylonitrile, butadiene, and styrene; polyvinyl acetate; condensed high molecular weight compounds such as a polyacetal resin, a polyvinyl alcohol derivateive, a cellulose derivative, a polycarbonate, a polyamide, a polyether or polyester; and natural or artificial rubbers such as a natural rubber, butyl rubber, neoprene rubber, a rubber of copolymer of styrene and butadiene, silicone rubber or polyurethane. These acrylic, methacrylic, polyolefin, polyamide type, polyester type, polyurethane type, polycarbonate type, rubber type, and cellulose type compounds can be a single polymer, block or graft copolymers, and can be used alone or in combination.

The preferably hydrophobic polymer which is dispersed in water according to the present invention, that is, the emulsified polymer, is a copolymer formed of as a first ingredient, a diolefin monomer, as a second ingredient one or more vinyl monomers, and as a third ingredient one or more monomers which are different from the first ingredient and which have two or more vinyl groups, acryloyl groups, methacryloyl groups, or allyl groups per molecule, and the emulsified polymer, that is, latex, has a gel percentage defined later of 95 wt% or less, preferably from 50 to 95 wt%, more preferably from 60 to 90 wt%. If the gel percentage thereof is from 60 to 90 wt%, an undercoat layer having excellent surface property and sufficient adhesive force with a magnetic layer can be obtained. The resulting latex is coated on the corona discharged support to provide an undercoat layer.

The diolefin monomer which is one of ingredients composed of the above-described copolymer includes conjugated dienes, such as butadiene, isoprene, and chloroprene, with butadiene being the most preferred.

The vinyl monomer, a second ingredient of the copolymer in the present invention, can be any monomer provided that the monomer has one vinyl group. Preferred monomers include (I) styrene, acrylonitrile, methyl methacrylate, vinyl chloride, vinyl acetate, and the derivatives thereof, (II) alkyl acrylate, acrylamide, methacrylamide, acrolein, methacrolein, glycidyl acrylate, glycidyl methacrylate, 2-hydroxyethyl acrylate, 2-hydroxyethyl methacrylate, N-methylol acrylamide, N-methylol methacrylamide, vinyl isocyanate and allyl isocyanate.

The derivatives of styrene include, for example, methylstyrene, dimethylstyrene, ethylstyrene, diethylstyrene, isopropylstyrene, butylstyrene, hexylstyrene, cyclohexylstyrene, decylctyrene, benzylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, 4-fluoro-3-trifluoromethylstyrene, and methyl vinylbenzoate.

The vinyl monomer preferred in (II) includes acrylate, glycidyl(meth)acrylate and 2-hydroxyethyl(meth)acrylate.

The monomer, the third ingredient, which is different from the first ingredient, and has two or more vinyl groups, acryloyl groups, methacryloyl groups or allyl groups per molecule, is a so-called cross-linking agent which is generally added for polymerizing vinyl monomers, such as divinylbenzene, 1,5-hexadiene-3-yne, hexatriene, divinyl ether, divinylsulfone, diallyl phthalate, diallyl carbinol, diethylene glycol di(meth)acrylate, trimethylolpropane tri(meth)acrylate, or trimethylolpropane di(meth)acrylate, with divinylbenzene, divinyl ether and diethylene glycol di(meth)acrylate being preferred.

Content of the diolefin monomer in the copolymer is preferably from 10 to 60 wt% and more preferably from 15 to 40 wt%, based on the total weight of diolefin monomer and vinyl monomer.

Content of the vinyl monomer as the second ingredient is preferably from 90 to 40 wt%, and when the vinyl monomer is a styrene(s), the content of styrene(s) is more preferably from 70 to 40 wt% based on the total weight of diolefin monomer and vinyl monomer.

The monomer having at least two vinyl groups, acryloyl groups, methacryloyl groups, or allyl groups per molecule as a third ingredient is preferably used in an amount of from 0.01 to 10 wt%, and more preferably from 0.1 to 5 wt%, based on the total weight of diolefin monomer and vinyl monomer.

Preferred copolymers having the following combination of ingredients are set forth below, with the numerical values indicating the wt% values as defined above. That is the values indicated in the first and the second ingredients are weight ratios between the first and the second ingredients, excluding the third ingredient. The values in the third ingredient indicate the weight percentages per total amounts of the first and the second ingredients.

|  | First ingredient | Second ingredient | Third ingredient |
| --- | --- | --- | --- |
| (1) | butadiene 33 | styrene 67 | divinyl benzene 0.5 |
| (2) | butadiene 25 | styrene 75 | divinyl benzene 0.5 |
| (3) | butadiene 40 | styrene 60 | divinyl benzene 0.5 |
| (4) | butadiene 33 | styrene 67 | divinyl benzene 0.1 |
| (5) | butadiene 33 | styrene 67 | divinyl benzene 5 |
| (6) | isoprene 33 | styrene 67 | divinyl benzene 0.5 |
| (7) | butadiene 33 | methyl methacrylate 67 | divinyl benzene 0.5 |
| (8) | butadiene 33 | acrylonitrile 67 | divinyl benzene 0.5 |
| (9) | butadiene 33 | chloromethyl-styrene 67 | divinyl benzene 0.5 |
| (10) | butadiene 33 | styrene 67 | diethylene glycol dimethylacrylate 0.5 |
| (11) | butadiene 33 | styrene 67 | trimethylolpropane trimethacrylate 0.5 |
| (12) | butadiene 33 | styrene 67 | diallyl phthalate 0.5 |

The copolymer comprised of the above-described three ingredients has a gel percentage of 95 wt% or less and preferably from 50 to 95 wt%.

Gel referred to herein means the state where ingredients of a copolymer are polymerized three-dimensionally. As the above described ingredients are three-dimensionally polymerized, and the polymerization proceeds, solubility of the copolymer into a solvent changes. That is, as the three-dimensional polymerization proceeds, the copolymer dissolves into a solvent with more difficulty.

Accordingly, the degree of three-dimensional polymerization of gel can be determined from the solubility thereof. As the degree of solubility depends upon the solvent to be used, the degree of three-dimensional polymerization is defined also depending upon the solvent. Gel means the state that ingredients are three-dimensionally copolymerized and that three-dimensional copolymer does not dissolve in purified tetrahydrofuran at 20° C. even after it being soaked therein for 48 hours.

Gel percentage in the present invention can be obtained from the following equation.

$$\text{Gel percentage (\%)} = \frac{W_1 - W_2}{W_1} \times 100$$

wherein $W_1$ is the weight of copolymer of a sample, and $W_2$ is the weight of a solid content of the filtrate obtained by soaking the sample which had undergone vacuum drying at 20° C., in purified tetrahydrofran for 48 hours at 20° C. and filtered. That is, $W_2$ is a weight of copolymer that dissolved into the tetrahydrofuran.

When a latex of a copolymer comprised of a diolefin monomer and one or more kinds of a vinyl monomer excluding the above described third ingredient has the gel percentage of the copolymer of less than 50 wt%, and such latex is coated and dried, the surface of the undercoat layer tends to be the scratched surface. This tendency becomes worse as the gel percentage decreases.

When ethylenic unsaturated carboxylic acid is not contained as one ingredient of the copolymer, sufficient adhesive force can be obtained even at a low temperature heat treatment.

Methods for preparing an aqueous dispersion of the copolymer can be referred to *Gosei Gomu Gaisetsu* (Outline of Synthetic Rubbers), by Harumi Asai, pages 39 to 59, issued on 1971 by Asakura Shoten and a magazine issued by Nippon Rubber Institute, Vol. 50, Issued No. 12, pages 802 to 806, published in 1977.

That is, the aqueous dispersion of the copolymer can be prepared by emulsifying and polymerizing the monomers of the above three ingredients in the presence of water, an emulsifying agent, a polymerization initiator or a polymerization adjusting agent (chain transferring agent) and the like.

An emulsifying agent includes a soap of aliphatic acid, a rosined soap, and the like, which is preferably used in an amount of 0.1 to 5 wt% based on the weight of the copolymer.

A polymerization initiator includes, for example, peroxides such as $NaPo_4.10H_2O$, $K_2S_2O_8$, p-menthan-hydroperoxide, $FeSO_4.7H_2O$, or EDTA (tetrasodium salt).

A polymerization adjusting agent includes a primary or tertiary mercaptan having from 6 to 18 carbon atoms such as t-todecyl mercaptan, t-nonyl mercaptan or t-decyl mercaptan.

The polymerization adjusting agent is preferably used in an amount of from 0.05 to 2.0 wt% based on the weight of the copolymer. It can be introduced into a reacting vessel before polymerization reaction starts or can be introduced little by little on the way of polymerization reaction.

A polymerization terminating agent such as hydroquinone or dimethyl carbamate and the like can be used to terminate polymerization reaction on the way, and can be added at any time when the polymerization reaction appropriately proceeds. The amount thereof is preferably about 0.1 wt% based on the weight of the copolymer.

In order to obtain a desired gel percentage, kinds and amounts of the polymerization adjusting agent used for emulsifying and polymerizing reaction can suitably be selected or a polymerization terminating agent can be added at an appropriate time.

After emulsifying and polymerizing the ingredients, latex of the copolymer can be obtained, and the unreacted monomers are removed. The removing method is disclosed, for example, in Japanese Patent Publication No. 20075/1974.

Concentration of the copolymer, which is the solid content of the aqueous dispersion, can be appropriately selected depending on the particular purpose, and generally it is from 10 to 60 wt% and preferably from 30 to 50 wt%.

In order to coat the thus-obtained aqueous dispersion of the copolymer on a support of a magnetic recording medium to provide an undercoat layer, the aqueous dispersion can be diluted with water, and, if desired, a hardening agent, a surfactant, a swelling agent, a hydrophilic polymer, a matting agent, and an antistatic agent can be added thereto.

Content of the copolymer comprised of three ingredients and/or the aforesaid hydrophobic polymer in an undercoat layer coating composition is from 1 to 10 wt% and preferably from 2 to 5 wt%.

The composition for the undercoat layer can be coated by a conventionally known method, such as a dip coating method, an air knife coating method, a curtain coating method, a roller coating method, a wire bar coating method, a gravure coating method, or an extrusion coating method using a hopper as disclosed in U.S. Pat. No. 2,681,294. If necessary, two or more layers can be coated simultaneously by methods, as disclosed in U.S. Pat. Nos. 2,761,791, 3,508,947, 2,941,898, and 3,526,528 and *Coating Kogaku* (Coating Technology), by Hitoshi Harazaki, page 253, published by Asakura Shoten in 1973.

The coating amount (solids content) of the hydrophobic polymer on a support is generally from 0.01 to 10 g/m², and preferably from 0.10 g to 3 g/m².

The thus-coated undercoat layer is then subjected to drying treatment at from 100° C. to 200° C. for a period of from 2 sec. to 10 min. The optimum time and the temperature can be properly determined, within the above range, depending on the particular properties intended.

The undercoat layer is coated on a support and dried, and then a magnetic layer is provided thereon.

A compound which is cross-linkable and polymerizable by radiation exposure, and is used as a binder for the magnetic particles in a magnetic layer in the present invention is preferably a compound having (meth)acryloyl groups, and specifically, a mixture of urethane acrylate oligomer and a monomer which is cross-linkable and polymerizable by radiation exposure and has one or more carbon-carbon unsaturated bond per molecule such as a low molecular weight acrylate monomer is preferred. In addition to the above two, a vinyl chloride type resin containing OH groups or COOH groups or a cellulose type can preferably be added.

Specific examples of the binder composition are described as follows.

(i) Vinyl chloride type resins containing OH groups or COOH groups include a copolymer of vinyl chloride, vinyl acetate, and acrylic acid, a copolymer of vinyl chloride, vinyl propionate, and maleic acid, a copolymer of vinyl chloride, vinyl propionate, and butenic acid, and a copolymer of vinylidene chloride, vinyl acetate, and maleic acid. The number of —OH groups or —COOH groups is generally from $5 \times 10^{-5}$ to $2 \times 10^{-3}$ equivalent, and preferably from $3 \times 10^{-4}$ to $1 \times 10^{-3}$ equivalent, per g of the copolymer. Electromagnetic properties are significantly reduced when the number thereof is outside of the above range. A cellulose resin includes cellulose acetate butyrate, cellulose acetate propionate, cellulose diacetate, and cellulose nitrate, and the most preferred resin is cellulose nitrate.

(ii) A urethane acrylate oligomer which is obtained by reacting a urethane prepolymer having an isocyanate group at the terminals and/or at the side chain with a compound having (meth)acryloyl group and generally has a number average molecular weight of from 500 to 100,000, and preferably from 1,000 to 30,000, can be used. When the molecular weight is less than 500, a magnetic layer of thus obtained magnetic recording medium is too hard and easily cracks when it is bent, and a magnetic recording medium tends to curl when a urethane acrylate oligomer is hardened and shrunk after radiation exposure. When the molecular weight is more than 100,000 on the other hand, solubility of urethane acrylate oligomer into a solvent tends to decrease, handling is difficult, dispersibility of magnetic particles deteriorates and extremely high energy is necessary for hardening.

(iii) A compound which is cross-linkable and polymerizable by radiation exposure and has one or more carbon-carbon unsaturated bond per molecule includes acrylates, acrylamides, methacrylates, methacrylamides, allyl compounds, vinyl ethers, vinyl esters, heterocyclic vinyl compounds, N-vinyl compounds, styrenes, acrylic acid, methacrylic acid, crotonic acids, itaconic acids, and olefines. Among those, preferred compounds are low molecular weight (less than 500) acrylate monomers having at least two acryloyl groups or methacryloyl groups, such as acrylates (e.g.., diethylene glycol diacrylate, triethylene glycol diacrylate, tetraethylene glycol diacrylate, trimethylolpropane triacrylate, pentaerythritol tetraacrylate, dipentaerythritol pentaacrylate, and dipentaerythritol hexacrylate), methacrylates (e.g., diethylene glycol dimethacrylate, triethylene glycol trimethacrylate, tetraethylene glycol dimethacrylate, trimethylolpropane trimethacrylate, and pentaerythritol tetramethacrylate) or esters of two or more functional polyol with acrylic acid or methacrylic acid. These monomers can be used alone or in combination.

If desired, other compounds which has one or more carbon-carbon unsaturated bonds per molecule and is polymerizable by electron beam irradiation can be added into the above-described binder composition.

The mixing weight ratio of the compounds described in (i) to the compound described in (ii) is generally from 20/80 to 90/10, and preferably from 30/70 to 80/20. When the compounds described in (i) and (ii) have a ratio outside the broad range set forth above, high durability cannot be obtained. The amount of the compounds described in (iii) is generally from 40 to 200 parts by weight, preferably from 50 to 150 parts by weight, per 100 parts by weight of both of the compounds (i) and (ii). When it is more than the above ratio, amount of electron beam exposure necessary for polymerization becomes high, which is unfavorable. On the other hand, when it is below the above range, the cross-linking reaction is too insufficient to obtain sufficient durability.

Ferromagnetic particles used in the present invention include ferromagnetic iron oxide particles, Co-containing ferromagnetic iron oxide particles, ferromagnetic chromium dixoide particles, ferromagnetic metal particles, and barium ferrite. An acicular ratio of ferromagnetic iron oxide and chromium dioxide particles is generally from 2/1 to 20/1, and preferably more than 5/1. Average length is from about 0.2 to 2.0 $\mu$m. Ferromagnetic metal particles contain 75 wt% or more metal component, and 80% or more of the metal component is comprised of ferromagnetic metal (i.e., Fe, Co, Ni, Fe—Co, Fe—Ni, Co—Ni, and Fe—Co—Ni) having a length (longest diameter) of 1.0 $\mu$m or less and width (shortest diameter) of from 100 to 400 Å, preferably from 150 to 350 Å. Specific surface area of ferromagnetic particles measured by BET method is 25 m$^2$/g or more, preferably from 30 to 60 m$^2$/g. In the present invention, a magnetic layer can be a multi-layer. When a magnetic layer has two layers, a first and a second magnetic layers can have the same or different ferromagnetic particles. It is preferred that a second magnetic layer (upper layer) has the same or higher coercive force than a first magnetic layer.

The magnetic layer generally has a thickness of from 1 $\mu$m to 10 $\mu$m, and preferably from 2 $\mu$m to 6 $\mu$m.

Organic solvents used for dispersing magnetic particles and coating magnetic coating composition include ketones such as acetone, methyl ethyl ketone, methyl isobutyl ketone or cyclohexanone; esters such as methyl acetate, ethyl acetate, butyl acetate, ethyl lactate, or monoethyl ether of glycol acetate; glycol ethers such as ether, glycol dimethyl ether, glycol monoethyl ether, or dioxane; aromatic hydrocarbons such as benzene, toluene or xylene; chlorinated hydrocarbons such as methylene chloride, ethylene chloride, carbon tetrachloride, chloroform, ethylene chlorohydrin, or dichlorobenzene; and tetrahydrofuran.

Additives such as a lubricating agent, an abrasive agent, a dispersing agent, an antistatic agent, or a rust-preventing agent can be added into a magnetic coating composition of the present invention. Particularly, a lubricating agent includes saturated or unsaturated higher fatty acids, fatty acid esters, higher fatty acid amides, higher alcohols, silicone oil, mineral oils, edible oils, and fluorine compounds, which can be added when a coating composition is prepared or can be coated or sprayed on the surface of a magnetic layer with or without an organic solvent after drying, smoothing treatment, or electron beam hardening treatment.

While $\beta$-rays and $\gamma$-rays and the like can be used as a radiation source for radiation exposure, electron beams using an electron beam accelerator are a preferred source.

A scanning method, a double scanning method, a curtain beam method, and a broad beam curtain method can be used for accelerating electron beams.

Useful electron beam characteristics include an accelerating voltage of from 100 to 1000 kV, preferably from 150 to 300 kV, an absorption dose is from 0.1 to 20 megarads, preferably from 0.5 to 10 megarads. When the accelerating voltage is less than 100 kV, the amount of energy transmitted is insufficient and when the accelerating voltage exceeds 1000 kV, the energy efficiency used for polymerization decreases and is uneconomical. When the total absorption dose is less than 0.1 megarad, the hardening reaction is insufficient to obtain the desired mechanical strength in a magnetic layer. When the absorption dose is more than 20 megarads, the energy efficiency used for the hardening reaction is lowered or the irradiated object generates heat, whereby the plastic support tends to deform.

Calendering treatment is conducted in a conventional manner. Generally, calendering treatment is conducted after the magnetic layer is coated.

The present invention is illustrated in more detail by the following Examples and Comparative Examples. In Examples and Comparative Examples, all parts are by weight.

EXAMPLE 1

Compositions 1 for an undercoat layer and Composition A for a magnetic layer were prepared.

| Composition 1 for an undercoat layer | |
|---|---|
| Latex of copolymer of butadiene-styrene-divinyl benzene (solid content: 50%; weight ratio of butadiene/styrene: 33/67; content of divinyl benzene: 0.5 wt % per total butadiene and styrene; and gel percentage: 70 wt %) | 10 ml |
| Sodium salt of 2,4-dichloro-6-hydroxy-s-triazine (8% aq. sol.) | 2 ml |
| Distilled water | 150 ml |
| Composition A for a magnetic layer | |
| Co—$\gamma$-Fe$_2$O$_3$ (Co: 5 wt %, Hc: 680 Oe, average particle size: 0.4 $\mu$m × 0.04 $\mu$m) | 400 parts |
| Binder composition: | |
| Copolymer of vinyl chloride-vinyl acetate-maleic acid (COOH content: 1.5 × 10$^{-4}$ equivalent per g of polymer) | 40 parts |
| Urethane acrylate oligomer ("Aronics M1100", trademark manufactured by Toa Gosei Chemical Industry Co., Ltd.) | 30 parts |
| Tris-2-acryloyloxyethyl isocyanurate | 30 parts |
| Lecithin | 4 parts |
| Stearic acid | 4 parts |
| Butyl stearate | 4 parts |
| $\alpha$-Al$_2$O$_3$ | 4 parts |
| Carbon black | 10 parts |
| Methyl ethyl ketone | 500 parts |
| Toluene | 500 parts |

The above composition was mixed and kneaded in a ball mill for 50 hours to prepare Composition A for a magnetic layer.

The surface (center line average roughness (Ra): about 0.006 $\mu$m) of the polyethylene terephthalate support having 10 $\mu$m thickness was subjected to corona discharge treatment of 3000 J/m$^2$, and thereon Composition 1 for an undercoat layer was coated. Then, the undercoat layer was dried at 130° C. for 15 sec. and heat-treated so that the drying thickness of the undercoat layer was 0.3 $\mu$m. Composition A for a magnetic layer was coated on the undercoat layer so that the dry thickness of the magnetic layer was 5.0 $\mu$m. The magnetic layer was subjected to magnetic orientation using a cobalt magnet and an electromagnet, and the solvent was evaporated (MAX 100° C., 1 min.) to obtain a magnetic tape. The above process was continuously carried out at a speed of 80 m/min. The thus-obtained magnetic tape was subjected to smoothing treatment using calender rollers composed of seven pairs of plastic rollers and metallic rollers (metal roller temperature: 80° C.), and was exposed to radiation at an accelerating voltage of 165 kV, and a beam current of 4 mA so that the absorption dose was 7 megarads. The resulting tape was designated as Sample No. 1.

EXAMPLE 2

The same procedure as in Example 1 was repeated except that Fe—Ni ferromagnetic metal particles (saturation magnetization: $\sigma_s$140 emu/g (magnetic field when measured: 10 KOe), Hc: 1480 Oe, BET specific surface area: 48 m$^2$/g) were used as magnetic particles in Composition A to obtain a magnetic tape (Sample No. 2).

COMPARATIVE EXAMPLES 1 AND 2

A magnetic tape was prepared in the same manner as in Examples 1 and 2 except that the corona discharge treatment was not carried out. The resulting tapes were designated as Sample Nos. 3 and 4, respectively.

COMPARATIVE EXAMPLES 3 AND 4

Two magnetic tapes were prepared in the same manner as in Examples 1 and 2, except that the undercoat layer was not provided, and were designated as Sample Nos. 5 and 6, respectively.

COMPARATIVE EXAMPLES 5 AND 6

Two magnetic tapes were prepared in the same manner as in Examples 1 and 2, except that the corona discharge treatment was not carried out and that an undercoat layer was not provided, and were designated as Sample Nos. 7 and 8, respectively.

The sample tapes prepared in Examples 1 and 2 and in Comparative Examples 1 through 6 were evaluated with respect to friction coefficient ($\mu$ value)[*1], durability time in a still mode[*2], video S/N[*3], running durability[*4], and adhesive force of the magnetic layer[*5], in the manner described below, and the results are shown in Table 1.

[*1]: $\mu$ Value

Tapes were mounted on a VHS video tape recorder "Maclord 88", (NV-8200 type) trademark, manufactured by Matsushita Electric Industries Co., Ltd. The friction coefficient was defined in terms of $\mu$ value calculated by the following equation:

$$T_2/T_1 = \exp(\mu\pi)$$

where $T_1$ is a tape tension at the supply side of the rotary cylinder of VTR, and $T_2$ is a tape tension at the take-up side of the rotary cylinder. Running tension was evaluated in accordance with $\mu$ value. This test was done at 40° C. and 65% RH (relative humidity).

[*2]: Durability time in a still mode

By recording certain video signals on a video tape (each sample) using a VHS video tape recorder (NV-8200 type) manufactured by Matsushita Electric Industries Co., Ltd. and replaying the video signals, the time for reproduced still images to lose their clarity was measured. This test was done at 40° C. and 80% RH.

[*3] and [*4]: Video S/N and running durability

The same tape recorder as above was used. Noise was measured with 925 type S/N meter manufactured by Shibasoku Co., Ltd. by recording a 50% set-up grey signal. Video S/N were relative values respective to that of Sample No. 1 being taken as 0 dB. Running durability was shown in terms of the number of decrease of output (decrease by 50% or less) observed during 300 passes when initial output of each sample was taken as standard (0 dB).

*5: Adhesive force

A part of a magnetic tape slipt to a ½ inch width was adhered on a glass plate by means of a double sided adhesive tape and the tape was jerked away. The adhesive force was shown in terms of a strippable force with which the tape was jerked away. This test was done at 23° C. and 50% RH.

TABLE 1

| Example; Comparative Example | Sample No. | Friction Coefficient ($\mu$ value) | Durability Time in a Still Mode (min.) | Video S/N (dB) | Running Durability (Number of decrease of output | Adhesive Force (g) |
|---|---|---|---|---|---|---|
| Example | | | | | | |
| 1 | 1 | 0.22 | more than 120 | 0.0 | 0 | more than 200 |
| 2 | 2 | 0.23 | more than 120 | +10.0 | 0 | more than 200 |
| Comparative Example | | | | | | |
| 1 | 3 | 0.24 | 60 | +0.1 | 82 | 60 |
| 2 | 4 | 0.25 | 50 | +10.0 | 110 | 50 |
| 3 | 5 | 0.23 | 80 | −1.5 | 90 | 50 |
| 4 | 6 | 0.24 | 60 | +8.2 | 153 | 30 |
| 5 | 7 | 0.27 | 15 | −0.6 | 105 | 10 |
| 6 | 8 | 0.29 | 4 | +9.5 | 200 | 5 |

It is apparent from the results shown in Table 1 that a magnetic recording medium of the present invention has high adhesive force, long durability time in a still mode, high video S/N and excellent running durability. During the process of manufacturing the tape of the Examples according to the present invention, separation of the magnetic layer was not observed, whereas during the process in the Comparative Examples, the calender rollers were stained or separation of the magnetic layer was observed.

While the invention has been described in detail and with reference to specific embodiments thereof, it will be apparent to one skilled in the art that various changes and modifications can be made therein without departing from the spirit and scope thereof.

What is claimed is:

1. A method for preparing a magnetic recording medium comprising a non-magnetic support having provided thereon a magnetic layer containing a compound which is cross-linkable or polymerizable by radiation exposure, which comprises conducting a corona discharge treatment on a surface of a support, coating an aqueous dispersion of hydrophobic polymer on the surface of the support to form an undercoat layer, providing a magnetic layer on the undercoat layer, and exposing the magnetic layer to radiation, wherein the hydrophobic polymer comprises a copolymer formed of a diolefin monomer as a first ingredient, a vinyl monomer as a second ingredient, and a monomer which is different from the first ingredient, having two or more vinyl groups, acryloyl groups, methacyloyl groups, or allyl groups per molecule as a third ingredient, and said hydrophobic polymer has a gel percentage of 95 wt% or less and wherein the third ingredient is selected from the group consisting of divinyl benzene, 1,5-hexadiene-3-yne, hexatriene, divinyl ether, divinylsulfone, diallyl phthalate, diallyl carbinol, diethylene glycol di(meth)acrylate, trimethyloyl propane tri(meth)acrylate, and trimethylolpropane di(meth)acrylate.

2. A method as claimed in claim 1, wherein said corona discharge treatment is conducted using a roller electrode.

3. A method as in claim 1, wherein the corona discharge treatment is provided using an alternating current having a wave shape selected from a sine wave, a triangular wave, a square wave, a saw wave, and a pulse wave, having an earth to peak value of from 2 kV to 30 kV and a frequency of from 50 Hz to 500 kHz.

4. A method as in claim 1, wherein the corona discharge treatment is applied in an energy range of from 500 to 30,000 joule/m$^2$.

5. A method as in claim 1, wherein said hydrophobic polymer has a gel percentage of from 50 to 95 wt%.

6. A method as in claim 1, wherein the first ingredient is a conjugated diene.

7. A method as in claim 1, wherein the conjugated diene is butadiene, isoprene or chloroprene.

8. A method as in claim 1, wherein the second ingredient is selected from the group consisting of styrene, acrylonitrile, methyl methacrylate, vinyl chloride, vinyl acetate, the derivatives of the above compounds, alkyl acrylate, acrylamide, methacrylamide, acrolein, methacrolein, glycidyl acrylate, glycidyl methacrylate, 2-hydroxyethyl acrylate, 2-hydroxyethyl methacrylate, allyl acrylate, allyl methacrylate, N-methylol acrylamide, N-methylol methacrylamide, vinyl isocyanate, and allyl isocyanate.

9. A method as in claim 1, wherein the third ingredient is divinylbenzene, divinyl ether or diethylene glycol di(meth)acrylate.

10. A method as in claim 1, wherein the content of diolefin monomer is from 10 to 60 wt% and the content of vinyl monomer is from 90 to 40 wt% based on the total weight of diolefin monomer and vinyl monomer, and the third ingredient is used in an amount of from 0.01 to 10 wt% based on the total weight of diolefin monomer and vinyl monomer.

11. A method as in claim 1, wherein the aqueous dispersion of hydrophobic polymer is coated in an amount (solids content) of from 0.01 to 10 g/m$^2$.

12. A method as in claim 1, wherein the aqueous dispersion of hydrophobic polymer is coated in an amount (solids content) of from 0.10 to 3 g/m$^2$.

13. A magnetic recording medium produced by the method of claim 1.

14. A magnetic recording medium as claimed in claim 13, wherein said magnetic recording medium exhibits improved durability time in the still mode, improved video SN and running durability and improved adhesion of the undercoat layer to the support as compared to a magnetic recording medium which has not been subjected to said corona discharge treatment.

15. A method as in claim 1, wherein said magnetic recording medium exhibits improved durability time in the still mode, improved video SN and running durability and improved adhesion of the undercoat layer to the support as compared to a magnetic recording medium which has not been subjected to said corona discharge treatment.

* * * * *